UNITED STATES PATENT OFFICE.

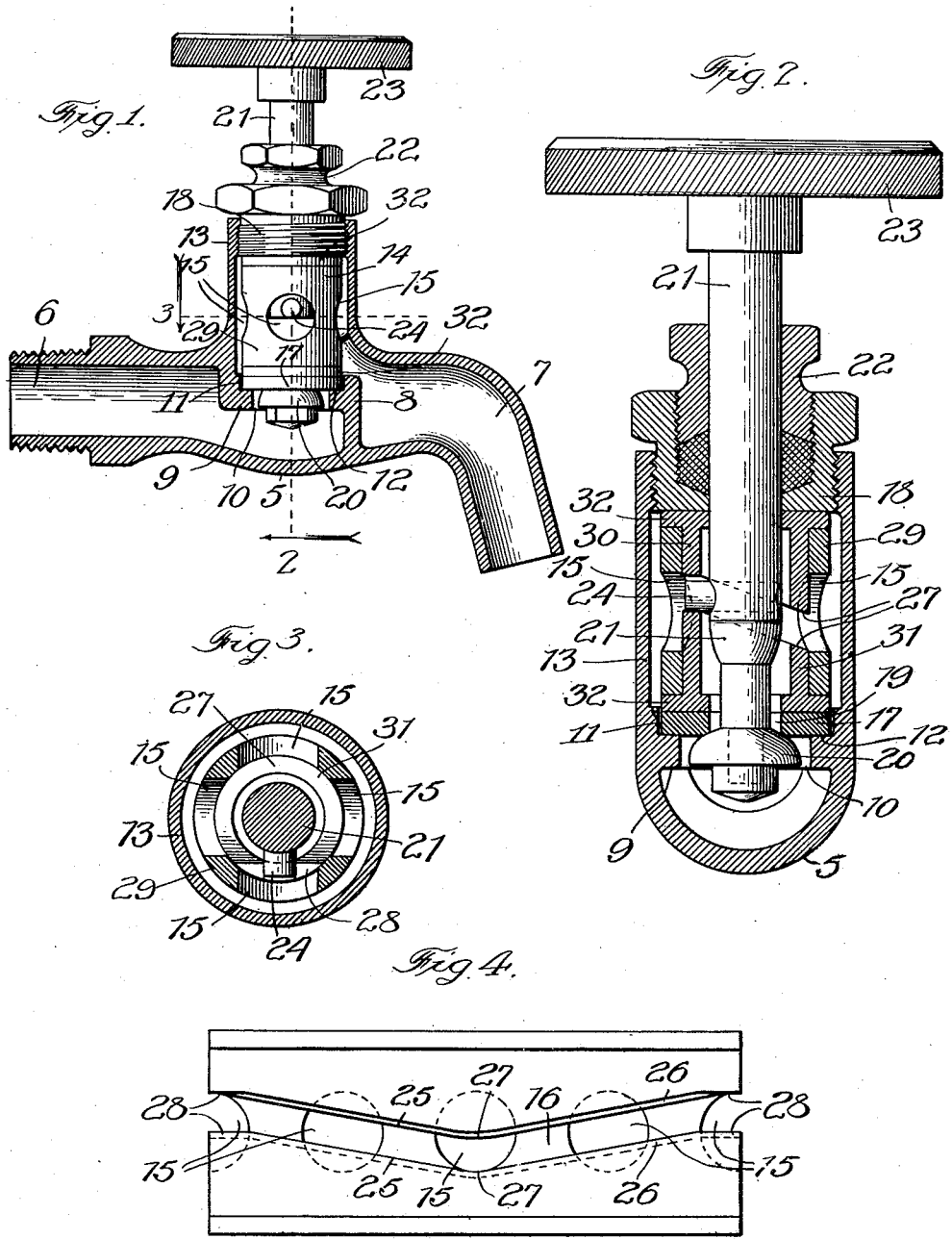

JOHN KELLY, OF CHICAGO, ILLINOIS.

VALVE.

1,111,390. Specification of Letters Patent. Patented Sept. 22, 1914.

Application filed May 27, 1912. Serial No. 700,136.

*To all whom it may concern:*

Be it known that I, JOHN KELLY, a citizen of the United States, residing at Chicago, in the county of Cook and State of Illinois, have invented a new and useful Improvement in Valves, of which the following is a specification.

My object is to provide improvements in valves, and more especially faucet valves, to the end of rendering them less liable to impairment from use, than in the case of valves as hitherto provided, minimizing danger of leakage and permitting them to be readily and quickly repaired when damaged, and generally to render them better adapted for the use to which they are placed.

My invention is illustrated in the accompanying drawings, in which—

Figure 1 is a view in longtitudinal sectional elevation of a faucet constructed in accordance with my invention, the parts of the valve illustrated being shown in elevation. Fig. 2 is an enlarged section taken at the line 2 on Fig. 1 and viewed in the direction of the arrow. Fig. 3 is an enlarged section taken at the line 3 on Fig. 1 and viewed in the direction of the arrow; and Fig. 4, a developed view of a cage forming a part of the valve structure illustrated in the previous figures, the cage being viewed from the interior thereof.

The faucet illustrated in the drawings is formed of a casing 5, provided between its inlet end 6 and discharge end 7, with an angular partition 8, the longtitudinally-extending portion 9 thereof containing an opening 10, the upper portion of which is of enlarged diameter, as represented at 11, to afford an annular seat 12. The casing 5 is formed with a tubular section 13, which is located above the portion 9 of the partition 8 and is in communication with the discharge end 7 of the faucet, and preferably is concentric relative to the opening 10. Located in the section 13 of the casing 5 is a cage 14 which is spaced from the annular wall of the section 13 and contains openings 15 about its outer periphery which communicate with an endless cam-groove on its inner periphery, thereby affording at all times communication between the interior of the cage and the discharge end 7 of the casing 5. The cage 14 seats at its lower open end upon an annular gasket 17, resting upon the seat 12, and is held firmly in position against rotation by means of an apertured plug 18, which screws into the upper end of the section 13 of the casing, and bears down against the upper end of the cage 14. By this arrangement, the cage 14 and gasket 17 are rigidly clamped between the seat 12 and the plug 18, and a water-tight joint between these parts is afforded. Coöperating with the wall of the opening 19 in the gasket 17, said opening being of less diameter than the opening 10, is an upwardly seating valve 20, carried on the lower end of a stem 21, which extends through said gasket, the cage 14, and through a stuffing-box 22, in the plug 18, the upper end of the stem 21 being provided with a hand-wheel 23.

The stem 21 is of such size as to cause it to be spaced from the wall of the opening 19 in the gasket and the inner surface of the cage 14, whereby when the valve 20 is operated, as hereinafter described, to move it out of engagement with the gasket 17, the fluid will flow from the end 6 of the casing through the gasket and cage and out through the openings 16 and 15 into the discharge end 7 of the casing.

The valve 20 is actuated to open it against the fluid pressure or close it with said pressure, as desired, by rotating the stem 21, and to this end the latter is provided with a radially extending pin 24, which extends into the cam-groove 16 and engages with the walls thereof, the groove 16 being formed with a double incline 25, 26, and preferably with flat surfaces 27 and 28 at the upper and lower ends of said inclines, whereby the stem 21 may be rotated in either direction to actuate the valve 20.

In order that the continuous cam-groove 16 may be provided in the cage 14 I prefer to form the latter of an outer cylindrical section 29, which contains the openings 15, and short tube sections 30 and 31, preferably flanged, as indicated at 32, and fitting within, and secured to, the section 29, as by solder, the opposing ends of the tube sections 30 and 31 being spaced apart and so shaped as represented, as to form between them the endless cam-groove 16.

It will be understood from the foregoing that the stem 21 may be rotated in either direction to open or close the valve 20, and is capable of continuous rotation in either direction, for actuating said valve, by reason of the provision of the endless cam-groove 16 in which the pin 24 travels and thus danger of unscrewing, or bucking the parts of the valve or straining the hand of the operator is avoided.

The provision of the cam-groove 16 as described renders unnecessary the use of springs, and in the preferred embodiment of my invention, the valve, by reason of the shape and formation of said groove, is caused to remain in any position into which it is moved by actuating the stem, as distinguished from valves which automatically move to closed condition when released.

When repairs to the interior of the valve are required to be made, it may be quickly and readily removed from the casing by unscrewing the plug 18 therefrom.

What I claim as new and desire to secure by Letters Patent, is—

1. A valve device comprising a casing containing a valve-seat, a cage in said casing formed of an outer apertured cylindrical member opening through said valve-seat and into the casing beyond said seat and tubular sections secured in said member and spaced apart at their opposing ends to form a continuous cam-groove therebetween, a valve coöperating with said seat and equipped with an operating stem extending through said cage and casing, and a pin on said stem extending into said cam-groove, for the purpose set forth.

2. A valve device comprising a casing containing an apertured partition, a gasket fitting against said partition and about the opening therein to form a valve-seat, a cage in said casing having an opening in one end thereof at which end it bears against said gasket and registers with the opening in the latter, said cage being formed of inner tubular members and an outer tubular member, said outer member being apertured and said inner members being spaced apart at their opposing ends to form an endless cam-groove therebetween and communicating with the apertures in said outer tubular member, a plug on the casing bearing against the other end of the cage, a valve coöperating with said seat and closing in the direction of the flow of the fluid through said casing, the stem of said valve extending through said gasket, cage and plug and journaled in the latter, and a pin on said stem extending into said cam-groove, for the purpose set forth.

JOHN KELLY.

In presence of—
OTTILIE C. AVISUS,
L. HEISLAR.

---

Copies of this patent may be obtained for five cents each, by addressing the "Commissioner of Patents, Washington, D. C."